(12) United States Patent
Kulkarni et al.

(10) Patent No.: US 6,387,349 B1
(45) Date of Patent: May 14, 2002

(54) PROCESS FOR THE MICROWAVE INDUCED PREPARATION OF CRYSTALLINE MICROPOROUS TITANIUM SILICALITE

(75) Inventors: Shivanand Janardan Kulkarni; Muppa Ramakrishna Prasad; Gunda Kamalakar; Kondapuram Vijaya Raghavan; Potharaju Seetharamanjaneya Sai Prasad; Katabathini Narsimha Rao, all of Hyderabad (IN)

(73) Assignee: Council of Scientific And Industrial Research, New Delhi (IN)

( * ) Notice: Subject to any disclaimer, the term of this patent is extended or adjusted under 35 U.S.C. 154(b) by 0 days.

(21) Appl. No.: 09/817,745

(22) Filed: Mar. 26, 2001

(51) Int. Cl.$^7$ .................. C01B 39/06; C01B 39/36; C01B 33/20
(52) U.S. Cl. ............... 423/707; 423/713; 423/326; 423/DIG. 22
(58) Field of Search ................ 423/705, 707, 423/713, 326, DIG. 22

(56) References Cited

U.S. PATENT DOCUMENTS

| | | | | |
|---|---|---|---|---|
| 4,410,501 A | * | 10/1983 | Taramasso et al. | 423/326 |
| 4,778,666 A | * | 10/1988 | Chu et al. | 423/326 |
| 5,082,641 A | * | 1/1992 | Popa et al. | 423/326 |
| 5,401,486 A | * | 3/1995 | Mueller et al. | 423/705 |
| 5,885,546 A | * | 3/1999 | Kumar et al. | 423/703 |
| 5,908,604 A | * | 6/1999 | Stenzel et al. | |
| 5,919,430 A | * | 7/1999 | Hasenzahl et al. | 423/702 |
| 5,977,009 A | * | 11/1999 | Faraj | 502/64 |

FOREIGN PATENT DOCUMENTS

| | | | |
|---|---|---|---|
| CN | 1275530 A | * | 12/2000 |
| EP | 358 827 A | * | 3/1990 |

* cited by examiner

*Primary Examiner*—David Sample
(74) *Attorney, Agent, or Firm*—Ladas & Parry

(57) ABSTRACT

The present invention relates to a process for the microwave induced preparation of crystalline, microporous titanium silicalite. More particularly; the present invention relates to a process for the preparation of crystalline microporous titanium silicalite of the formula: $xTiO_2:(1-x)SiO_2$ wherein x is greater than 0.043 and less than or equal to 0.11. These silicalites, prepared under microwave irradiation have the same physico-chemical properties as titanium silicalite prepared by hydrothermal methods.

10 Claims, No Drawings

PROCESS FOR THE MICROWAVE INDUCED PREPARATION OF CRYSTALLINE MICROPOROUS TITANIUM SILICALITE

FIELD OF THE INVENTION

The present invention relates to a process for the microwave induced preparation of crystalline, microporous titanium silicalite. More particularly, the present invention relates to a process for the preparation of crystalline microporous titanium silicalite of the formula: $xTiO_2:(1-x)SiO_2$ wherein x is greater than 0.043 and less than or equal to 0.11. These silicalites, prepared under microwave irradiation have the same physico-chemical properties as titanium silicalite prepared by hydrothermal methods reported in the literature and are useful as oxidation catalysts in reactions such as oxidation of phenol to catechol and hydroquinone, benzene to phenol, hydrocarbons, alcohols and oxidation of aromatic heterocycles to heterocyclic N-Oxides.

More specifically, the invention relates to the application of microwave irradiation during the crystallization of the gel leading to faster formation of titanium silicates with the crystal structure of silicalite-1.

BACKGROUND OF THE INVENTION

Titanium silicates are useful in catalyzing various oxidation reactions such as the conversion of benzene into phenol, phenol into hydroquinone (commercialized by Enichem, Italy) and catechol, cyclohexanone into cyclohexanone oxime, ethanol into acetaldehyde, isopropanol into acetone, heterocycles to corresponding heterocyclic N-oxides etc. In all the above applications, it has been found that the catalytic efficiency of titanium silicate material is directly proportional to the content of titanium in the titanium silicalite. That is, the more the amount of titanium contained in these materials, the higher the rate with which they catalyze the above mentioned conversion processes. Hence, any process of preparation that leads to TS-1 of formula $xTiO_2:(1-x)SiO_2$ wherein x is higher than 0.04 would lead to material with improved catalytic activity in the above mentioned reactions.

U.S. Pat. No. 3,329,482 Young describes crystalline titanosilicates prepared from siliceous and inorganic titanium compounds in the absence of organic bases. The U.S. Pat. No. 4,410,501 describes a process for the preparation of titanium silicalite, TS-1 with the formula $xTiO_2:(1-x)SiO_2$ where x lies between 0.005 and 0.04. GB Patent 2071071 B describes a process for the preparation of TS-1 with the structure of silicalite-1. Thangaraj et al in their papers published in Zeolites, (vol. 12, pp.943–950 (1992), November/December and Journal of Catalysis, vol. 130, No. 1, pp. 1–8 (1991), no month) describes a method of preparation of TS-1 which takes 1–6 days for crystalliztion. Rajiv Kumar et al. (Nature, vol.381, 298–300 (1996), May) improved the method of TS-1 synthesis, by the incorporation of promoter ions and reported that the crystallization time could be brought down to 5–6 hours.

Microwave irradiation has been applied extensively for the faster and cleaner synthesis of organic compounds, organometallics and inorganic compounds. Its application in catalyst synthesis and evaluation is gaining momentum. Microwave irradiation ig reported to offer faster process rates, uniform distribution of active species in the catalyst pellet and improvement in crushing strength of the pellet. Microwave heating successfully applied in the synthesis of ZSM-5, A Zeolites (Chu, P., et al EP 358 827 (1990)), Y (Van Bekkum et al, Zeolites, vol.13, 162–165(1993)) and AlPO sub-5 molecular sieves (J. Caro et al, Zeolites Vol. 15, 33–39(1995).

The process for the preparation of TS-1, in the prior art, as for example in the above mentioned U.S. Pat. No. 4,410,501 Example 2) comprises mixing the sources of silicon (preferably silicon tetraethoxide) and titanium (preferably titanium tetraethoxide) at low temperature (5° C.) before adding organic base (such as tetrapropyl ammonium hydroxide aqueous solution) precooled to 5° C. and water. Since the rate of hydrolysis of titanium tetraethoxide is much faster compared to that of silicon tetraethoxide the cooling of the reaction mixture is important to avoid the formation of insoluble or sparingly soluble titanium oxide/hydroxyoxide, which if formed hinders the formation of titanium silicate. However, the necessity to cool the reactants to 5° C. under industrial conditions is a limitation in the prior art process which entails significantly higher process energy costs. Further, in the above mentioned patent (U.S. Pat. No. 4,410,501), the crystallization time of TS-1 under hydrothermal conditions at autogeneous pressure ranges between six and thirty days.

Another patent (U.S. Pat. No. 5,885,546) describes the preparation of titanium silicalite with the general formula, $xTiO_2:(1-x)SiO_2$ where in x is equal to or less than 0.075. The microporous, crystalline titanium silicates having a silicalite-1 structure was prepared and a gel formed by mixing a source of (i) silicon oxide (such as: alkoxides, amorphous silica, colloidal silica etc.) and (ii) titanium oxide (like alkoxide-β diketone mixture), (iii) a nitrogen containing organic base having the formula $R_4N^+$ where R represents propyl group and (iv) water at room temperature, heating the resultant gel in an autoclave at autogeneous pressure and a temperature between 140° C. to 200° C., filtering, washing, drying and calcining the resultant solid composite material at a temperature in the range of 300° C.–550° C. The crystallization time, as reported in the patent, was 1–5 days. In a publication by Kumar et al, (Nature, vol.381, 298–300 (1996)) a process for the preparation of the titanium silicalite using some promoter ions was described. The authors claim that by using the promoters the crystallization time could be brought down to 1–5 hours. Depending upon the Si/Ti ratio it can be understood from the literature that if the Ti content is low, the crystallization is faster and if the Ti content increases the crystallization time takes one hour to several days. Thus it is advantageous if the crystallization time could be reduced further.

OBJECTS OF THE INVENTION

It is an objective of the present invention to develop an improved process for the preparation of titanium silicates using microwave irradiation.

Another objective of the present investigation is to prepare titanium silicalite with higher framework content of titanium.

It is a further objective of the present invention to develop a process wherein all the process operations are carried out at ambient or higher temperatures.

It is a further objective of the present invention to develop a faster process which provides crystalline titanium silicalite in less than one hour for the silicate-with higher Si/Ti ratio and about two hours when the Si/Ti approximate a value 10.

SUMMARY OF THE INVENTION

Accordingly, the present invention provides a process for the microwave induced preparation of crystalline, microporous titanium silicalite of the chemical formula: $xTiO_2:(1-x)SiO_2$ wherein x is greater than or equal to 0.043 and less than or equal to 0.11 and characterized by the x-ray diffraction patterns as shown in Table 1.

TABLE 1

| $2\theta \pm 0.05$ | Relative Intensity |
|---|---|
| 7.82 | vs |
| 8.75 | ms |
| 13.20 | w |
| 13.98 | w |
| 14.74 | mw |
| 15.62 | w |
| 15.98 | w |
| 16.45 | w |
| 17.72 | w |
| 17.64 | w |
| 17.80 | w |
| 19.22 | w |
| 20.34 | mw |
| 20.82 | mw |
| 23.12 | vs |
| 24.28 | ms |
| 24.51 | ms |
| 24.40 | ms |
| 26.05 | w |
| 26.99 | w |
| 28.04 | w |
| 29.26 | w |
| 29.99 | mw |
| 45.12 | w |
| 45.51 | w | where
vs = very strong
s = strong
m = medium
w = weak.

and an infrared absorption spectra as shown in Table 2,

TABLE 2

| $cm^{-1}$ | Relative Intensity |
|---|---|
| 456 | S |
| 544 | MS |
| 800 | W |
| 960 | W |
| 1120 | VS |
| 1216 | S | where
VS = very strong
S = strong
M = medium
W = weak.

and wherein the Si/Ti ratio is in the range between 10 and 40, said process comprising heating a gel comprising a mixture containing (a) a source of silicon oxide, (b) a source of titanium oxide, (c) tetrapropyl ammonium hydroxide and (d) water by microwave irradiation at an autogenous pressure in the range of 10–15 bar and at a temperature in the range of 100° C. to 200° C. for a time period in the range of 30–120 minutes to obtain a solid composite material, filtering, washing and drying of the said solid composite material to form a dried composite material, and calcining the said dried solid composite material at a temperature greater than or equal to 300° C.

In one embodiment of the invention, x is at least 0.043.

In a further embodiment of the invention x is at least 0.050.

In another embodiment of the invention the gel further comprises an alcohol of the formula R—OH where R is an alkyl group having 2–5 carbon atoms.

In a frther embodiment of the invention, the alcohol is selected from the group consisting of ethyl, propyl, isopropyl, butyl, isobutyl and mixtures thereof In one embodiment of the invention the source of titanium oxide is a titanium alkoxide.

In yet another embodiment of the invention the source of said silicon oxide is selected from the group consisting of alkoxides, amorphous silica and colloidal silica.

In a further embodiment of the invention the source of said silicon oxide is tetraalkyl orthosilicate.

In another embodiment of the ivention the gel has a molar composition of $0.043-0.11\ TiO_2.1\ SiO_2.0.3-0.8(C_3H_7)_4N^+$: $2.0-5.0ROH:10-100H_2O$, wherein R is alkyl group having less than or equal to 5 carbon atoms.

In one embodiment of the invention, the gel is kept in a microwave oven and then irradiated.

In one embodiment of the invention, the gel is irradiated in a microwave oven by exposing to radiation with an applied power in the range 500 to1000W.

DETAILED DESCRIPTION OF THE INVENTION

The process for the preparation of crystalline microporous titanium silicalite comprises forming a gel by mixing (a) a source of silicon (b) a source of titanium (c) tetrapropyl ammonium hydroxide and water at ambient temperatures, irradiating the resultant gel in a microwave oven at pressures up to 10–15 bar and temperatures between 130° C. to 200° C. for 30–120 minutes, filtering, washing, drying. and calcining the resultant solid composite material at a temperature above 300° C.

The significant feature of the present invention is that microwave irradiation of the gel enhances the solubility of the titanium species thereby preventing the precipitation of titanium as titanium oxide/hydroxide which process occurs readily in the normal method of hydrothermal preparation. Thus cooling the gel to temperatures to as low as 5° C. or the usage of additional promoters or complexing agents like the beta-diketone to increase the solubility are avoided. An feature of the present invention is that the increased solubility allows more amount of titanium to go into the frame work when compared to the hydrothermal conditions.

In the composite of formula $xTiO_2:(1-x)SiO_2$ x is preferably equal to or less than 0.011, and is characterized by the x-ray diffraction patterns given in Table-1 and infrared absorption spectra as shown in Table-2. The starting gel is formed by mixing a source of (i) silicon oxide (such as: alkoxides, amorphous silica, colloidal silica etc.) and (ii) titanium oxide (like alkoxide), (iii) a nitrogen containing organic base having the formula $R_4N^+$where R represents propyl group and (iv) water at room temperature. To form the crystalline microporous titanium silicalite, the gel is heated in a microwave oven operating at powers between 500–1000W, at autogeneous pressure ranging 10–15 bar and a temperature between 140° C. to 200° C. for 30–120 minutes, the resultant solid composite material filtered, washed, dried and calcined at a temperature in the range of 300° C.–550° C.

The crystalline material of this invention was characterized by x-ray powder diffraction and infrared spectroscopic examination. The most significant lines of the x-ray powder diffraction pattern of the titanium rich titanium silicates is recorded over Philips 1051 using Ni-filter $CuK_\alpha$ radiation ($\lambda$=1.5405 Å).

The IR bands in framework region exhibited by these titanium silicates are compiled in Table-2. They exhibit a characteristic IR absorption band at about 960 cm$^{-1}$ which band is not present either in the spectrum of pure silicalite-1, or in the IR spectrum of titanium oxides (rutile, anatase) and alkaline titanates, The ratio of the intensity of 960 cm$^{-1}$ band and that of 550 cm$^{-1}$ band is found to have linear correlation with their titanium content as can be seen from Table-3.

TABLE 3

|  | X | Ratio[a] |
| --- | --- | --- |
| Titanium silicalite | 0.043 | 0.357 |
| Titanium silicalite | 0.050 | 0.418 |
| Titanium silicalite | 0.078 | 0.487 |
| Titanium silicalite | 0.11 | — |

[a]Ratio of 960 cm$^{-1}$/550 cm$^{-1}$ IR band

The reaction mixture comprises the sources of $SiO_2$, $TiO_2$ an organic base and water, and has the reagent molar composition as given above. The $SiO_2$ source is preferably a tetraalkyl orthosilicate (e.g. tetraethyl orthosilicate). The source of titanium is preferably a hydrolysable titanium compound e.g, Ti-alkoxides (e.g. $Ti(OC_4H_9)_4$. The organic base is a tetraalkyl ammonium hydroxide e.g. tetrapropyl ammonium hydroxide. The starting reagent mixture is subjected to microwave irradiation in a microwave oven at an operating pressure ranging 500–1000W, temperature of between 150° C. to 200° C. under autogenous pressure in the range of 10–15 bar, for a time of 5–55 minutes till the crystals of titanium silicalites are formed. The crystalline solid material so obtained is separated from mother liquor, washed thoroughly with deionized water and dried. The crystalline as synthesized and dried material is preferably calcined in an airflow at 500° C. –550° C. for 6–24 hours until the organic material is decomposed. The final organic free, anhydrous, titanium silicalites of the present invention have the composition: $xTiO_2:(1-x)SiO_2$ where the value of x is equal or less than 0.11.

These crystalline material can be subjected to ion exchange treatment with an aqueous solution containing ammonium ions using conventional ion exchange procedures, filtration, washing with water, drying and calcining at 400° C.–500° C. for 16 hours. Though the catalyst composite material obtained herein before may be directly used as a catalyst, it is desirable in various industrial applications, to enhance the mechanical strength and ease of handling by admixing it with a suitable binder material and converting it into a suitable shape such as cylindrical extradates, spheres, etc. Silica, clay mineral such as bentonite, kaolinite or mixtures thereof are examples of suitable binder material which impart improved mechanical properties to the titanium silicalite.

The crystallization time of the material is substantially reduced to minutes when subjected to microwave irradiation, compared to material prepared by normal hydrothermal methods which takes several hours or days. Synthesis was carried out in lesser timings with highest titanium incorporation which is responsible for the catalytic activity of the TS-1. The material prepared by the process of the present invention are useful as oxidation catalysts in reactions like oxidation of phenol to hydroquinone, hydrocarbons, alcohols etc.

The crystalline titanium silicalite prepared according to the process of the invention is particularly useful in 1) oxidation/hydroxylation of hydrocarbons or derivatives of hydrocarbons, 2) ammoximation of ketones, aldehydes, and 3) oxidation of organic sulfides, amines.

The practice of the process of the present invention is further illustrated by the following examples which are, however, not to be construed to limit the scope of the present invention.

EXAMPLE 1

Process for the Preparation of Crystalline Microporous Titanium Silicates 22.5 g. of tetraethyl orthosilicate with 10 g of isopropanol were taken in a glass beaker and a mixture comprising of 30 g tetrapropyl ammoniumhydroxide (20 wt. % solution in water), was added to it under stirring. This mixture was stirred for five minutes before adding to it a solution of 2.2 g. of titanium tetrabutoxide in 20 g of dry isopropanol under stirring. This mixture was stirred for another 1 hour at 25° C.–30° C. to complete the hydrolysis of tetraethoxy silane and tetra butyl otho titanate. Finally the remaining log of tetrapropyl ammonium hydroxide was added along with 30 grams of distilled water to the above clear solution and stirred at 75° C.–80° C. for about of 3–6 hours to remove alcohols. The whole mixture was transferred into a Teflon jar provided with temperature and pressure sensors and which is transparent to microwave irradiation, was capped tightly and put in a microwave oven. The crystallisation was carried out under static conditions for 90 minutes, operating power at 500–1000 watts. Then the Teflon jar was removed from the oven. The pressure was removed before opening the lid of the jar, it is cooled, and the contents were filtered, washed thoroughly with distilled water and dried at 120° C. for 6 hours and further calcined at 500° C.–550° C. in a flow of air for 6–24 hours. The XRD and IR data of the so obtained material corresponded to those given in Table-1 and Table-2, respectively. The material is identified as a titanium silicate with the crystal structure of silicalite-1. The molar chemical composition of the organic free calcined material was: $0.064TiO_2:0.936SiO_2$. The material was fully crystalline and no amorphous matter either within or outside its pores was detected confirming that the synthesis had been completed with in 90 minutes. This titanium silicate material was treated with 1N aqueous solution of ammonium acetate under reflux conditions for 6 hours, filtered, washed thoroughly with distilled water, dried at 90° C. for 6 hours and calcined at 500° C. in a flow of air 12 hours. The same procedure was repeated for once again to the ammonium acetate treated material before using it as a catalyst.

EXAMPLE 2

In this example, 22.5 g. of tetraethyl orthosilicate in 10 g of isopropanol was taken in a Glass beaker and a mixture comprising of 30 g. tetra-propyl. ammonium hydroxide (20 wt. % solution in water), was added to it under stirring. This mixture was stirred for five minutes before adding to it a solution of 1.1 g. titanium tetrabutoxide in 20 g. dry isopropanol under stirring. The mixture was stirred for 1 hour, the remaining 10 g. tetrapropyl ammonium hydroxide(20 wt. % aqueous solution ) was added along with 30 g. distilled water and stirred at 75° C.–80° C. to remove alcohols. The above clear gel loaded in to Teflon jar in the way mentioned above and put in microwave oven. The crystallisation was carried out under static conditions for 30 minutes, power operating at 500–1000 watts. The material identified as a titanium silicate had chemical composition $0.034TiO_2:0.966SiO_2$. The remaining procedure was same as given in the example1.

EXAMPLE 3

In this example 22.5 g. of tetraethyl orthosilicate in 10 g of isopropanlol was mixed under stirring with a solution comprising of 30 g. tetrapropyl ammonium hydroxide (20 wt % solution in water). This mixture was stirred for five minutes before adding to it a solution of 1.5 g. titanium tetrabutoxide in 20 g. dry isopropanol. The mixture was stirred for 1 hour, the remaining 10 g. tetrapropyl ammonium hydroxide (20 wt % solution in water) was added along with 10 g distilled water. The remaining procedure was same as given in example-1. The crystallisation was carried out under static conditions for 60 minutes, power operating at 500–1000 watts. The X-ray and I. R. data exhibited by the sample obtained in this example were essentially the same as given in Table-1 and Table-2, respectively. The molar chemical composition of the material was $0.040TiO_2:0.96SiO_2$.

EXAMPLE 4

In this example 22.5 g. of tetraethyl orthosilicate in 10 g. of isopropanol was mixed under stirring with a solution of 30 g. tetrapropyl ammonium hydroxide (20 wt % solution in water). This mixture was stirred for five minutes before adding to it a solution of 3.675 g. titanium tetrabutoxide in 20 g. dry isopropanol. The above mixture was stirred for 1 hour, the remaining tetrapropyl ammonium hydroxide (20 wt % solution in water) along with distilled water was added under stirring. The remaining procedure is the same as in Example 1. The crystallization was carried out under static conditions for 120 minutes operating at 500–1000 watts. The material obtained exhibited essentially the same X-ray diffraction and I. R. data as given in Table-1, and Table-2, respectively. The chemical composition of the material was: $0.98TiO_2:0.902SiO_2$. The remaining procedure was same as given in example 1.

EXAMPLE 5

This example illustrates the use of catalytic activity of the product obtained in Example 1. A typical oxidation of substituted pyridine to substituted pyridine N-oxide was carried out as follows. 0.5 g. of the material obtained according to example 1, (x=0.064) were added to a mixture containing 10.0 g 4-Cyano pyridine and 40 ml methanol under stirring. The temperature of this reaction mixture was kept at 60° C. and then 19.8 g. of $H_2O_2$ (30%) were added drop wise to the reaction mixture under stirring. The progress of the reaction followed by Thin Layer Chromatography. Then this reaction was carried out for 24 hours. Once the reaction was complete the catalyst was removed by filtration and the solvent was distilled off under vacuum. The isolated product by this procedure contained, exclusively the corresponding N-oxide is observed from the 1HNMR and mass spectra. 4-Cyanopyridne gave 9.6 g of coresponding 4-Cyanopyridine N-oxide without any trace of byproduct.

EXAMPLE 6

This example illustrates the catalytic activity of the product obtained in Example 2. 0.020 g. of the material obtained according to example 2 (x=0.0346) were added to a mixture containing 0.200 g phenol and 5 g. of acetone under stirring. The temperature of this mixture was kept at 25° C. Then 0.286 g. of $H_2O_2$ (30%), pre cooled to 5° C. were added drop wise to the reaction mixture under stirring. After the completion of the addition of $H_2O_2$ the reaction mixture was heated up to 60° C. Then this reaction was carried out for 5 hours. The reaction mixture was filtered to separate the catalyst, and the solvent was distilled off under vacuum. The products contained catechol and hydroquinone in 1.5:1 mole ratio with 100% utilization of hydrogen peroxide. The catalytic activity of the material in this reaction confirms that silicon is substituted by titanium in the crystalline framework since silicalite-1 with occluded titanium does not possess any catalytic activity in this reaction.

EXAMPLE 7

In this example the influence of titanium content of titanium silicates in the hydroxylation of phenol into catechol and hydroquinonre using hydrogen peroxide is illustrated. The results, recorded in Table 4, clearly demonstrate that the activity of titanium silicates increases with its titanium content. For second column the values present in the bracket are with the catalyst which is prepared in the conventional heating with same titanium content. The conversion of the phenol is kept low to avoid the other products.

TABLE 4

X = Ti/(Ti + Si) X is the fraction of tetrahedral Ti atoms in the total number of atoms present in the framework of titanium silicate

| X → | (Theoretical) 0 | 0.043 | 0.050 | 0.11 |
|---|---|---|---|---|
| Phenol Conversion Products | 0 | 29.0 (28.3) | 37.6 | 50.7 |
| Hydroquinone | 0 | 8.5 (8.5) | 11.0 | 13.0 |
| Catechol | 0 | 21.0 (19.8) | 26.6 | 37.7 |

We claim:
1. A process for the microwave induced preparation of a crystalline, microporous titanium silicalite having the chemical formula: $xTiO_2·(1-x)SiO_2$, wherein x is greater than or equal to 0.043 and less than or equal to 0.11, an x-ray diffraction pattern as follows:

| 2θ ± 0.05 | Relative Intensity |
|---|---|
| 7.82 | vs |
| 8.75 | ms |
| 13.20 | w |
| 13.98 | w |
| 14.74 | mw |
| 15.62 | w |
| 15.98 | w |
| 16.45 | w |
| 17.72 | w |
| 17.64 | w |
| 17.80 | w |
| 19.22 | w |
| 20.34 | mw |
| 20.82 | mw |
| 23.12 | vs |
| 24.28 | ms |
| 24.51 | ms |
| 24.40 | ms |
| 26.05 | w |
| 26.99 | w |
| 28.04 | w |
| 29.26 | w |
| 29.99 | mw |
| 45.12 | w |
| 45.51 | w | where
vs = very strong
s = strong
m = medium
w = weak and an infrared absorption spectra as follows:

| $cm^{-1}$ | Relative Intensity |
|---|---|
| 456 | S |
| 544 | MS |
| 800 | W |

-continued

| cm$^{-1}$ | Relative Intensity |
|---|---|
| 960 | W |
| 1120 | VS |
| 1216 | S | where
VS = very strong
S = strong
M = medium
W = weak said process comprising
   heating a gel comprising a mixture containing (a) a source of silicon oxide, (b) a source of titanium oxide, (c) tetrapropyl ammonium hydroxide, and (d) water by microwave irradiation at autogenous pressure in the range of 10–15 bar and at a temperature in the range of 100 to 200° C. for a time period in the range of 30–120 minutes to obtain the titanium silicalite,
   calcining the titanium silicate at a temperature of greater than or equal to 300° C.

2. A process as claimed in claim 1 wherein x is at least 0.050.

3. A process as claimed in claim 1 wherein said gel further comprises an alcohol of the formula R-OH where R is an alkyl group having 2–5 carbon atoms.

4. A process as claimed in claim 3 wherein the said alcohol is selected from the group consisting of ethyl, propyl, isopropyl, butyl, isobutyl and mixtures thereof.

5. A process as claimed in claim 1, wherein the source of titanium oxide is a titanium alkoxide.

6. A process as claimed in claim 1 wherein the source of said silicon oxide is selected from the group consisting of alkoxides, amorphous silica and colloidal silica.

7. A process as claimed in claim 1 wherein the source of said silicon oxide is tetraalkyl orthosilicate.

8. A process as claimed in claim 1, wherein said gel has a molar composition of 0.043–0.11 $TiO_2$:1$SiO_2$:0.3–0.8 $(C_3H_7)_4N^+$:2.0–5.0ROH: 10–100 $H_2O$, wherein R is alkyl group having less than or equal to 5 carbon atoms.

9. A process as claimed in claim 1 wherein the said gel is kept in a microwave oven and then irradiated.

10. A process as claimed in claim 9 wherein the said gel is irradiated in a microwave oven by exposing the gel to radiation with an applied power in the range 500 to 1000W.

* * * * *